United States Patent
Lampe et al.

(10) Patent No.: US 8,756,088 B2
(45) Date of Patent: Jun. 17, 2014

(54) SYSTEM AND METHOD FOR CALCULATING AN ORDER FLOWTHROUGH

(75) Inventors: Jason P. Lampe, Breese, IL (US); Jason Adams, Vincent, AL (US); Douglas W. Belew, Davis, CA (US); Xiaoling Cai, Hoffman Estates, IL (US); Paul Chambless, Fenton, MO (US); Jeffrey B. Myers, St. Louis, MO (US); Jesse L. Nelson, St. Louis, MO (US); Paul R. Shellum, Sterrett, AL (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 544 days.

(21) Appl. No.: 12/790,549

(22) Filed: May 28, 2010

(65) Prior Publication Data

US 2011/0295627 A1 Dec. 1, 2011

(51) Int. Cl.
*G06Q 10/00* (2012.01)

(52) U.S. Cl.
USPC .................. 705/7.11; 705/7.12; 705/7.39

(58) Field of Classification Search
USPC ................................. 705/7.11–7.42
See application file for complete search history.

(56) References Cited

U.S. PATENT DOCUMENTS

| | | | |
|---|---|---|---|
| 6,912,574 B2 * | 6/2005 | Scifres et al. ................ | 709/224 |
| 7,020,247 B1 * | 3/2006 | Williams ................... | 379/15.03 |
| 7,627,857 B2 * | 12/2009 | Rokosz ........................ | 717/124 |
| 2001/0049654 A1 | 12/2001 | Cecchetti et al. | |
| 2002/0188486 A1 * | 12/2002 | Gil et al. .......................... | 705/7 |
| 2003/0014142 A1 | 1/2003 | Olle et al. | |
| 2003/0130820 A1 * | 7/2003 | Lane, III ...................... | 702/184 |
| 2003/0149604 A1 * | 8/2003 | Casati et al. .................... | 705/7 |
| 2004/0137897 A1 * | 7/2004 | Teixeira ........................ | 455/423 |
| 2005/0137902 A1 | 6/2005 | Bowie-Britton | |
| 2005/0209732 A1 * | 9/2005 | Audimoolam et al. ....... | 700/216 |
| 2005/0256787 A1 * | 11/2005 | Wadawadigi et al. .......... | 705/28 |
| 2005/0289013 A1 * | 12/2005 | Goldberg ...................... | 705/26 |
| 2008/0082374 A1 * | 4/2008 | Kennis et al. .................... | 705/7 |
| 2009/0112928 A1 * | 4/2009 | Hoyt et al. .................. | 707/104.1 |
| 2009/0138384 A1 * | 5/2009 | McCormick et al. .......... | 705/28 |
| 2009/0287518 A1 | 11/2009 | Marode et al. | |
| 2010/0076808 A1 | 3/2010 | Hutchinson et al. | |
| 2010/0088147 A1 * | 4/2010 | Guldner et al. ................... | 705/9 |

* cited by examiner

*Primary Examiner* — Sujay Koneru
(74) *Attorney, Agent, or Firm* — Guntin & Gust, PLC; Ralph Trementozzi

(57) ABSTRACT

An ordering system backend includes an ordering system module, an exclusion system module, an exception system module, a summary system module, and a display device. The ordering system module is configured to receive ordering data for a plurality of orders and to receive information concerning the flowthrough status of the order. The exclusion system module is configured to generate or receive a plurality of exclusions associated with a plurality of exceptions for the plurality of orders. The exception system module is configured to generate or receive exception data associated with the plurality of orders, to receive the plurality of exclusions from the exclusion system module, and to update the exception data based on the plurality of exclusions. The summary system module is configured to calculate summary level data based on the plurality of orders and the exception data, and to create summary tables based on the summary level data. The display device includes a graphical user interface configured to display the summary tables.

20 Claims, 4 Drawing Sheets

SYSTEM AND METHOD FOR CALCULATING AN ORDER FLOWTHROUGH

FIELD OF THE DISCLOSURE

The present disclosure generally relates to communications networks, and more particularly relates to a system and a method for calculating an order flowthrough.

BACKGROUND

An ordering system can include multiple software and/or hardware systems for processing orders. During an ordering process, a problem may arise for an order at a particular software and/or hardware system. Such a problem or fallout may result in an exception being created for the order. When the exception is created, the order may need manual intervention from an individual associated with a backend of the ordering system to correct the problem, the order may be resubmitted through automated backend process, or the order may be canceled and need to be resubmitted.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
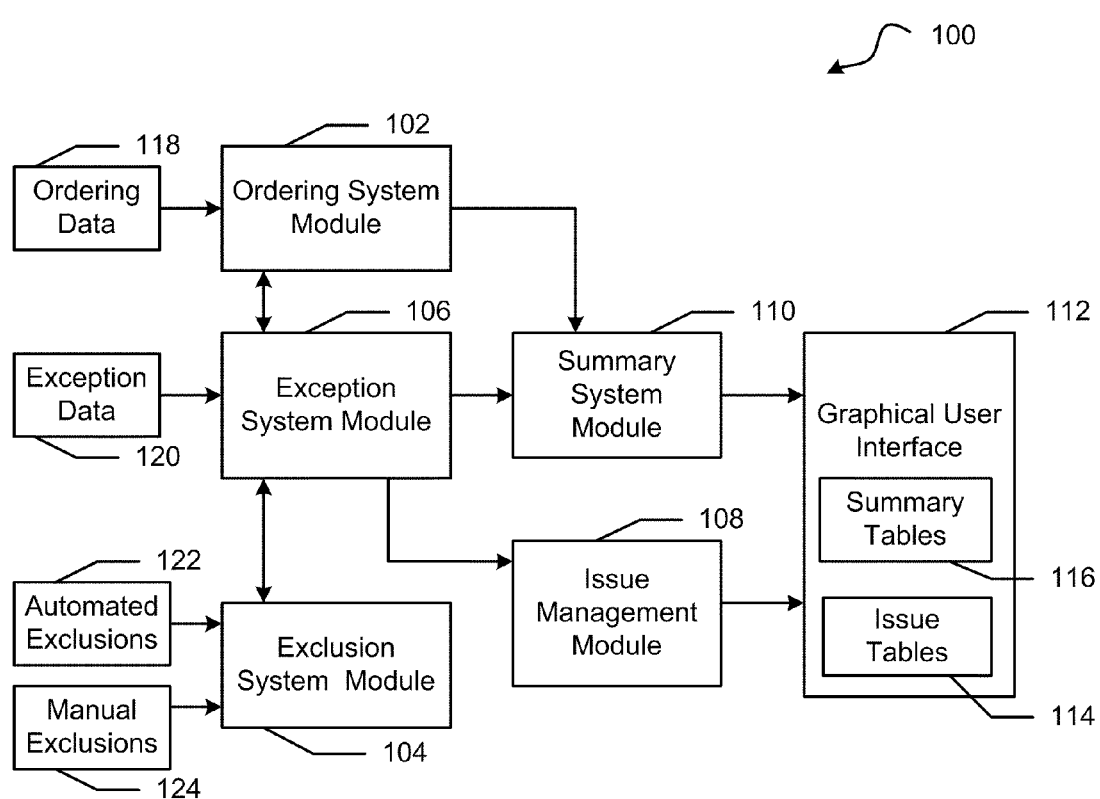
FIG. 1 is a block diagram of an ordering system backend.

FIG. 1 shows an ordering system backend 100 including an ordering system module 102, an exclusion system module 104, an exception module 106, an issue management module 108, a summary system module 110, and a graphical user interface (GUI) 112. The ordering system module 102 is in communication with the exception system module 106 and with the summary system module 110. The exclusion system module 104 is in communication with the exception system module 106, which in turn is in communication with the issue management module 108 and with the summary system module 110. The issue management module 108 is in communication with the GUI 112, through the use of issue tables 114. The summary system module 110 is in communication with the GUI 112, through the use of summary tables 116. The ordering system module 102, the exclusion system module 104, the exception module 106, the issue management module 108, the summary system module 110 can be hardware implemented in separate devices or can be combined into one or more devices. The GUI 112 can be located on a display device.

During operation of the ordering system backend 100, the ordering system module 102 can retrieve ordering data 118, which can include new orders, completed orders, pending orders, and the like. Pending orders can be orders that are still in processing, and that have not reached a particular activity in the ordering process, such as a close order action, which can be used as a marker for a completed order. A completed order can be an order that has been processed beyond a particular activity, such as the close order action. The orders can be for a number of services or products, such as Internet Protocol television (IPTV) service, Internet data service, cellular telephone service, a set-top box device, a residential gateway, a cellular telephone, or the like. An activity can be any individual processing step along the order flow path, such as ordering, provisioning, installation, and hand-off to billing. The ordering system module 102 can incrementally retrieve or receive the ordering data 118. For example, if the ordering system module 102 retrieves or receives the ordering data 118 for a particular time frame ending at 11:30:00 am, then the next time the ordering system module retrieves or receives the ordering data the new time frame can begin at 11:30:01 am, such that the ordering data is not duplicated in the order system module.

The ordering system module 102 can then utilize the ordering data 118 combined with the exception data 120 to create ordering tables that can show the flowthrough of orders in the ordering system backend 100. Flowthrough can be an indication of success or failure of an order during a process flow. Thus, a successful flowthrough can indicate that an order has completed processing without halting or needing human intervention. Alternatively, a failure or exception can mean that an order was halted during processing because of an error, such as an un-excluded exception, or other reason that required human intervention for the order to continue processing.

The exception system module 106 can generate, retrieve, or receive exception data 120 from multiple systems for existing orders or generate an exception based on business rules, and the exception data is preferably generated, retrieved, or received during the same time period as the ordering data 118. The exception data 120 can include exceptions associated with non-completed orders listed in the ordering data 118. An exception can be created when a system or an application has encountered a problem with the order and has provided a message giving information about the problem. Additionally, an exception may or may not count against flowthrough depending on information received from the exclusion system module 104, which in turn can create or retrieve both automated exclusions 122 and manual exclusions 124. An exclusion can be a business decision made to excuse or discount an ordering exception from counting against flowthrough. The automated exclusions 122 can be determined when an ordering exception is cleared by an automated process, such as an automatic retry process. Therefore, a business decision can be made that a particular exception should not count against flowthrough. Thus, an order that has an exception which is then excluded can be given a good flowthrough standing. The manual exclusions 124 can be orders that are excluded from counting against flowthrough by an individual of the ordering system backend 100.

When all of the exclusions, both automated and manual, have been generated, received, or retrieved, the exclusion system module 104 can send the exclusions to the exception system module 106. The exception system module 106 can then determine which of the exceptions in the exception data 120 have been excluded based on the automated exclusions 122 and/or the manual exclusions 124. The exceptions that have been excluded can then be effectively removed from the exception data 122. Thus, based on the exclusion information from the exclusion system module 104, the exception system module 106 can update the ordering data 118 to determine orders with un-excluded exceptions or errors. For example, if an order listed in the ordering data 118 has an associated exception in the exception data 120 that is not excluded, the exception system module 106 in communication with the ordering system module 102 can determine that the order should count against flowthrough. Thus, an exception can be an error if it does not have a corresponding exclusion, and only errors can count against flowthrough. The exception system module 106 can then send the updated exception data 120 to the ordering system module 102 and to the issue management module 108.

The issue management module 108 can utilize the updated exception data to aid in root cause analysis and calculate a weighted count for the flowthrough. The weighted count can be a flowthrough value that is based on apportioning the un-excluded exceptions. For example, if the updated exception data shows an order with no flowthrough and that order has four errors, then these errors would each have a weight of twenty five percent, such as one order divided by four errors. The issue management module 108 can also calculate a flowthrough impact percentage. The flowthrough impact percentage can be a calculation of the percentage of flowthrough errors that are caused by a specific error or issue. For example, an order can have three exceptions that arise during a handle inventory activity, and two of the exceptions can be the same and one can be different. The one exception that is different may be excludable, and the two similar exceptions may not be excludable. Therefore, the order can fail flowthrough because of the two exceptions that are not excludable, and the flowthrough impact percentage can be shared across the two non-excludable exceptions. The issue management module 108 can perform an order level analysis showing that the handle inventory activity carries one hundred percent of the flowthrough impact for the order. The issue management module 108 can also perform an error level analysis to show that the true area of impact is at only two of the three exceptions, and each of the two errors carry fifty percent of the flowthrough impact. The issue management module 108 can then create issue tables 114, for display on the GUI 112, showing different activities and errors that carry certain percentages of the flowthrough impact. Thus, the issue tables 114 can indicate activities that need to be fixed to prevent flowthrough errors.

The summary system module 110 can use the updated order data to create summary tables 116 for display on the GUI 112. The summary tables 116 can include ordering tables, exception tables, exclusion tables, and the like. The summary tables 116 can be displayed on the GUI 112. The summary system module 110 can also calculate a leading flowthrough indictor (LFI) for an order. The LFI can be a percentage calculation based on the orders taken on a specified date that at the time of the calculation that still have good flowthrough standing, divided by the total number of orders taken for that specified date. The higher this indicator is on a consistent basis the better the chance that the flowthrough percent will still be high at the time orders are closing out. The summary system module 110 can also calculate a flowthrough percentage, which can be determined by dividing the number of orders in a category that have achieved successful flowthrough during a particular time period by the total number of orders within the same category during the same time period. For example, a flowthrough percentage can be a number of orders with good flowthrough taken during a day divided by a total number of orders taken that day.

Figure 2:
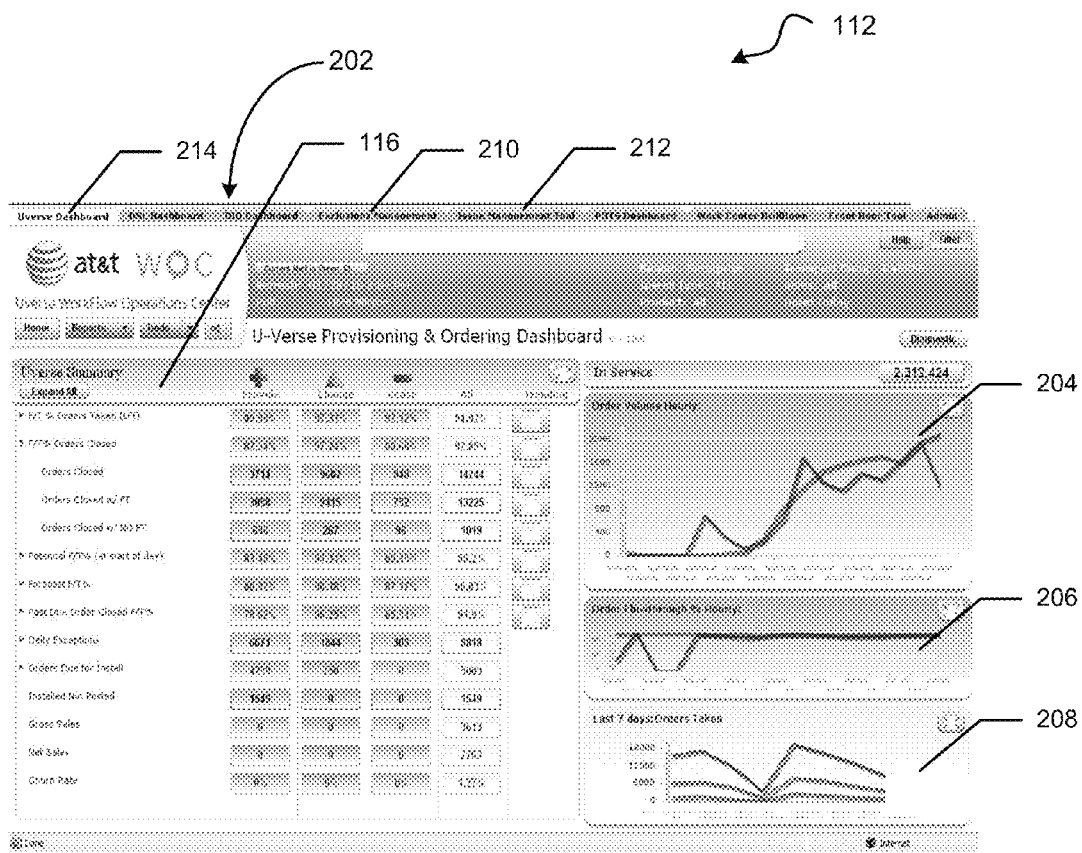
FIG. 2 is an exemplary screen shot of a graphical user interface home page associated with the ordering system backend.

FIG. 2 shows an exemplary embodiment of the GUI 112 including a summary table 116, management tabs 202, an order volume graph 204, an order flowthrough graph 206, and an orders taken graph 208. The management tabs 202 can include tabs for different services, such as IPTV service, digital subscriber line (DSL) Internet service, and plain old telephone service (POTS). The management tabs 202 can also include tabs for controlling the different modules of the ordering system backend 100, such as the exclusion system module 104 shown as Exclusions Management tab 210, and the issue management module 108 shown as Issue Management Tool tab 212.

When an individual associated with the ordering system backend 100 selects one of the management tabs 202, such as Uverse Dashboard tab 214, the GUI 112 can display the summary table 116 associated with the orders for that service. For example, the summary table 116 can show data for the leading flowthrough percentage (LFI), the flowthrough percentage of orders closed, the daily exceptions, and the like for the orders associated with IPTV service. The GUI 112 can also display other metrics associated with the service, such as the order volume graph 204, the order flowthrough graph 206, and the orders taken graph 208. Thus, the GUI 112 can display information associated with the flowthrough of orders and other metrics for each of the services or products that are monitored by the ordering system backend 100.

Figure 3:
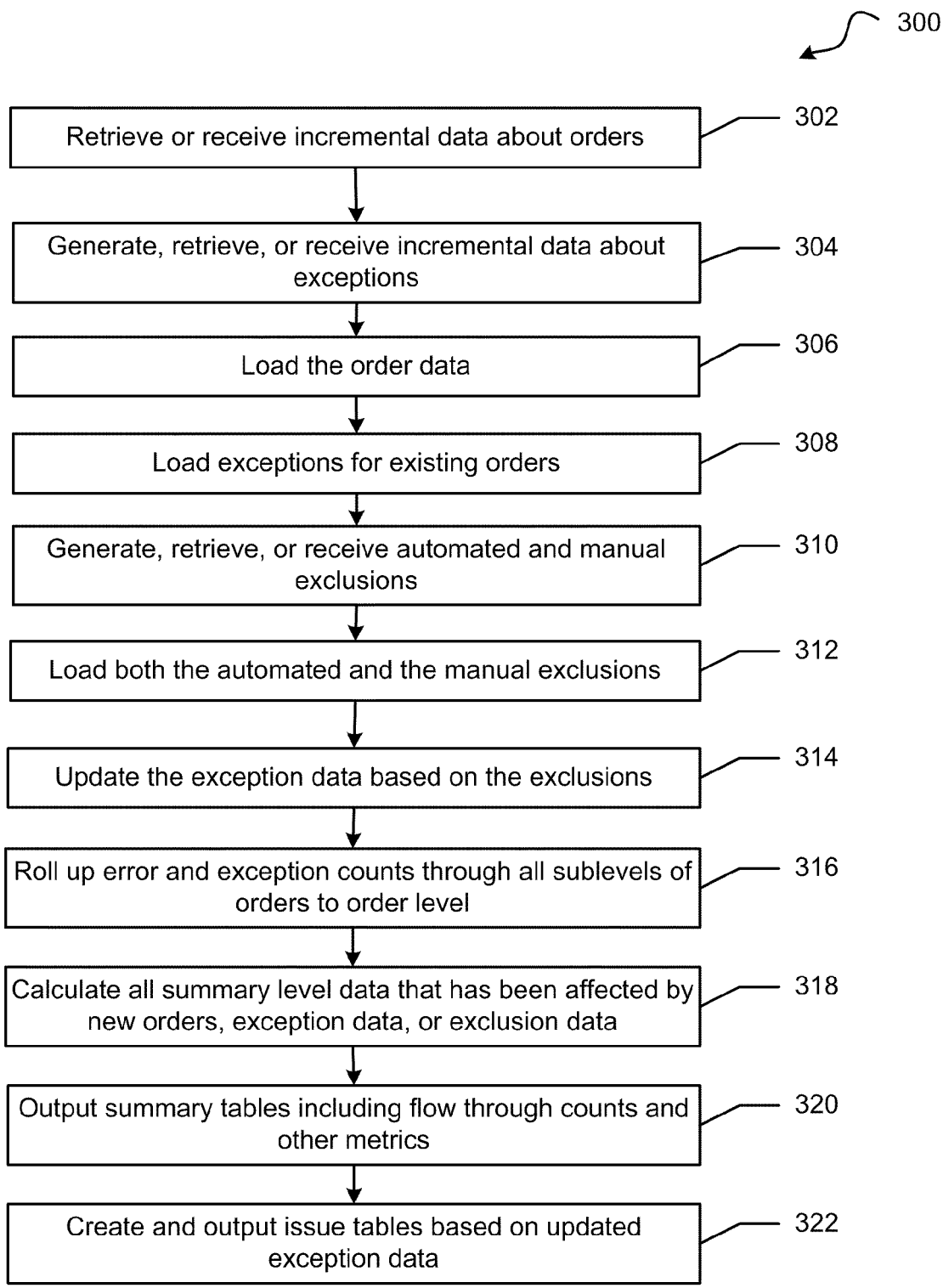
FIG. 3 is a flow diagram of a method for calculating an order flowthrough.

FIG. 3 shows a flow diagram of a method 300 for calculating an order flowthrough. At block 302, incremental data about a plurality of orders is retrieved or received by an ordering system module. For example, if the incremental data is retrieved or received for a particular time frame ending at 11:30:00 am, then the next time the incremental data is retrieved or received the new time frame can begin at 11:30:01 am, such that the ordering data is not duplicated in the order system module. Incremental data about exceptions for the plurality of orders is generated, retrieved, or received at block 304. The incremental data about the exceptions is preferably generated, retrieved, or received during the same time period as the incremental data for the plurality of orders. At block 306, the order data is loaded. Exceptions for existing orders are loaded at block 308. At block 310, automated and manual exclusions are generated, retrieved, or received. An exclusion can be a business decision made to excuse or discount an ordering exception from counting against flowthrough.

At block 312, the automated and the manual exclusions are loaded. The exception data is updated based on the exclusions at block 314. Error and exception counts are rolled up through all sublevels of order to the order level at block 316. At block 318, all summary level data that has been affected by the new order, pending orders, exception data, or exclusion data is calculated. Summary tables including the flowthrough counts and other metrics are output at block 320. The summary tables are preferably output to a graphical user interface. At block 322, issue tables are created and output. The issue tables can be created based on the updated exception data, and can show activities that need to be fixed to prevent flowthrough errors.

Figure 4:
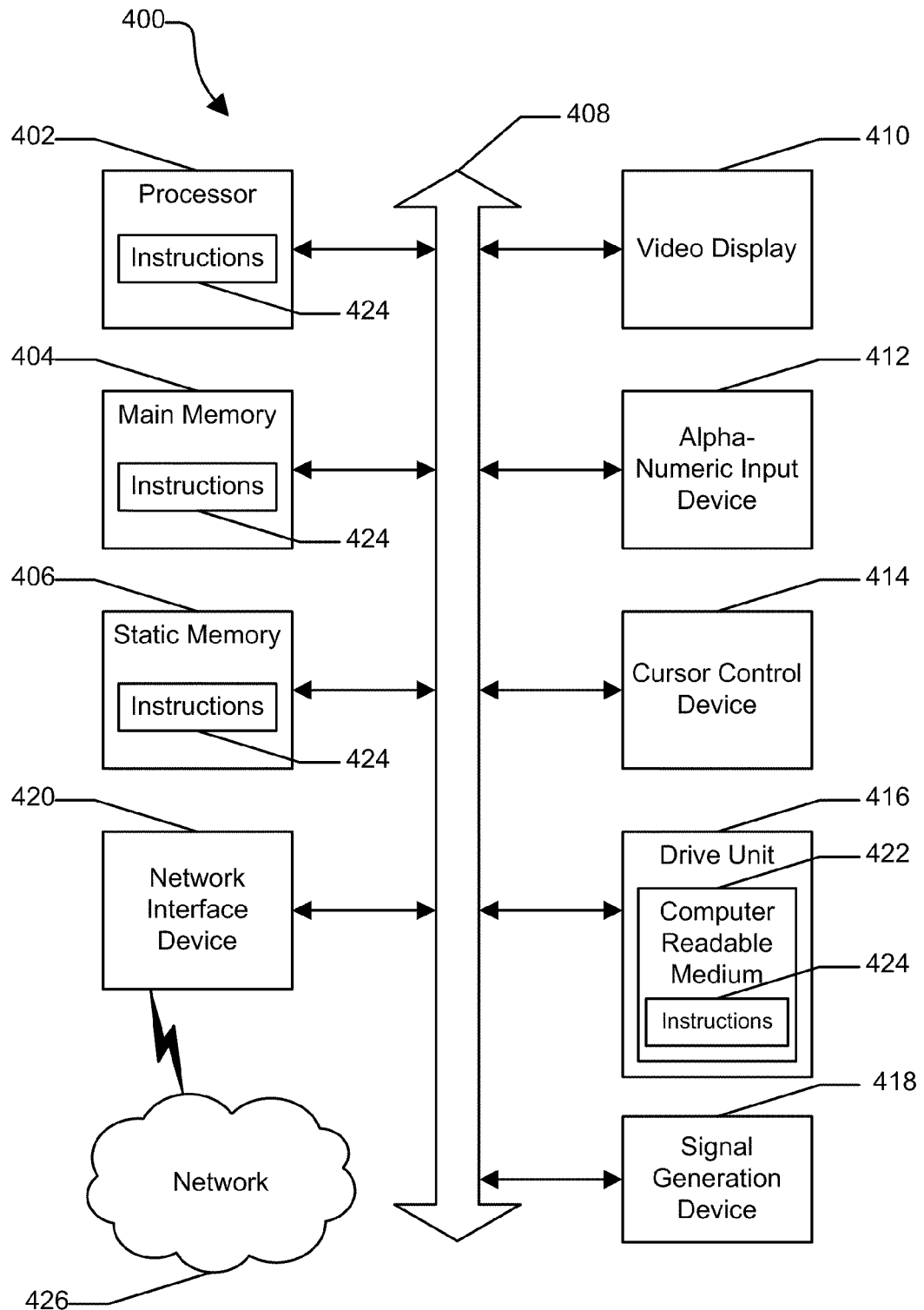
FIG. 4 is an illustrative embodiment of a general computer system.

FIG. 4 shows an illustrative embodiment of a general computer system 400. The computer system 400 can include a set of instructions that can be executed to cause the computer system to perform any one or more of the methods or computer based functions disclosed herein. The computer system 400 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 400 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

The computer system 400 may include a processor 402, such as a central processing unit (CPU), a graphics processing unit (GPU), or both. Moreover, the computer system 400 can include a main memory 404 and a static memory 406 that can communicate with each other via a bus 408. As shown, the computer system 400 may further include a video display unit 410 such as a liquid crystal display (LCD), an organic light emitting diode (OLED), a flat panel display, a solid state display, or a cathode ray tube (CRT). Additionally, the computer system 400 may include an input device 412 such as a keyboard, and a cursor control device 414 such as a mouse. The computer system 400 can also include a disk drive unit 416, a signal generation device 418 such as a speaker or remote control, and a network interface device 420 to communicate with a network 426. In a particular embodiment, the disk drive unit 416 may include a computer-readable medium 422 in which one or more sets of instructions 424, such as software, can be embedded. Further, the instructions 424 may embody one or more of the methods or logic as described herein. In a particular embodiment, the instructions 424 may reside completely, or at least partially, within the main memory 404, the static memory 406, and/or within the processor 402 during execution by the computer system 400. The main memory 404 and the processor 402 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. An ordering system backend comprising:
  a processor; and
  a memory in communication with the processor, the memory including a plurality of instructions that when executed cause the processor to perform operations comprising:
    receiving order data about a plurality of orders, wherein the order data includes a number of orders that have been completed and a number of orders that have not been completed;
    receiving exception data associated with the plurality of orders, wherein the exception data includes data about order exceptions that either are excused or are counted against a flowthrough of the plurality of orders;
    loading a plurality of exclusions associated with the order exceptions, wherein the plurality of exclusions are the order exceptions that are excused or discounted so that the order exceptions do not count against the flowthrough of the plurality of orders;
    updating the exception data, resulting in updated exception data, responsive to the plurality of exclusions, to remove excused order exceptions from the exception data;
    updating the order data to include the order exceptions both excused and counted against the flowthrough of the plurality of orders;
    generating an apportionment of the order exceptions counted against the flowthrough of the plurality of orders;
    determining, from the apportionment of the order exceptions, a weighted flowthrough count;
    deriving summary level data based on the plurality of orders and the updated exception data, wherein the summary level data is affected by new orders, the exception data, or the plurality of exclusions;
    creating summary tables based on the summary level data;

creating issue tables based on one of the exception data, the apportionment of the order exceptions, the weighted count, or combinations thereof; and outputting the summary tables and the issue tables to a graphical user interface, wherein the summary tables include flowthrough counts and other metrics.

2. The ordering system backend of claim 1 wherein the plurality of instructions further cause the processor to perform operations comprising:

updating the issue tables based on the updated exception data, wherein the issue tables show activities that cause order errors; and outputting the issue tables.

3. The ordering system backend of claim 1 wherein the plurality of instructions further cause the processor to perform operations comprising:

calculating a flowthrough impact percentage, wherein the flowthrough impact percentage is a calculation of a percentage of flowthrough errors that are caused by a specific error.

4. The ordering system backend of claim 1 wherein the plurality of instructions further cause the processor to perform operations comprising:

loading the order data about the plurality of orders; and
loading the exception data for the plurality of orders.

5. The ordering system backend of claim 1 wherein the plurality of exclusions includes automated exclusions and manual exclusions.

6. The ordering system backend of claim 1 wherein the summary tables are output to a graphical user interface.

7. The ordering system backend of claim 1 wherein the order data and the exception data are received incrementally.

8. An ordering system backend comprising:

a processor; and a memory in communication with the processor, the memory including a plurality of instructions that when executed cause the processor to perform operations comprising:

receiving ordering data for a plurality of orders, wherein the ordering data includes new orders, completed orders, canceled orders, pending orders, and order flowthrough information;

retrieving a plurality of exclusions associated with orders exceptions, wherein the plurality of exclusions are the order exceptions that are excused or discounted so that the order exceptions do not count against flowthrough of the plurality of orders;

generating or receiving exception data associated with the plurality of orders, to generate or receive the plurality of exclusions and to update the exception data based on the plurality of exclusions to remove excused order exceptions, wherein the exception data includes data about the order exceptions that either are excused or are counted against flowthrough of the plurality of orders;

calculating summary level data based on the plurality of orders and the exception data;

creating summary tables based on the summary level data, wherein the summary level data is affected by the new orders, pending orders, the exception data associated with the plurality of orders, and the plurality of exclusions; and generating an apportionment of the order exceptions counted against the flowthrough of the plurality of orders;

determining, from the apportionment of the order exceptions, a weighted flowthrough count;

creating issue tables based on one of the exception data, the apportionment of the order exceptions, the weighted count, or combinations thereof;

providing the summary tables and the issue tables to a display device.

9. The ordering system backend of claim 8, wherein the processor, responsive to executing the instructions, performs operations further comprising:

determining activities that cause the ordering errors.

10. The ordering system backend of claim 9 wherein the issue tables show the activities that cause the order errors.

11. The ordering system backend of claim 10 wherein the processor, responsive to executing the instructions, perform operations further comprising displaying the issue tables.

12. The ordering system backend of claim 9 wherein the processor, responsive to executing the instructions, performs operations further comprising outputting a flowthrough impact percentage, wherein the flowthrough impact percentage is a calculation of a percentage of flowthrough errors that are caused by a specific error.

13. The ordering system backend of claim 8 wherein the processor, responsive to executing the instructions, performs operations further comprising receiving the ordering data incrementally.

14. A non-transitory, computer readable storage medium comprising a plurality of instructions to manipulate a processor, which responsive to being manipulated by the plurality of instructions performs operations comprising:

receiving order data about a plurality of orders, wherein the order data includes a number of orders that have been completed and a number of orders that have not been completed;

generating or receive exception data associated with the plurality of orders, wherein the exception data includes data about order fallout that either are excused or are counted against flowthrough of the plurality of orders;

loading a plurality of exclusions associated with the plurality of orders and a plurality of exceptions, wherein the plurality of exclusions are order exceptions that are excused or discounted so that the order exceptions do not count against flowthrough of the plurality of orders;

updating the exception data responsive, resulting in updated exception data, to the plurality of exclusions, to remove excused order exceptions;

updating the order data to include the plurality of exceptions;

generating an apportionment of the order exceptions counted against the flowthrough of the plurality of orders;

determining, from the apportionment of the order exceptions, a weighted flowthrough count;

deriving summary level data based on the plurality of orders and the updated exception data, wherein the summary level data is affected by new orders, the exception data, and the plurality of exclusions;

creating summary tables based on the summary level data;

creating issue tables based on one of the exception data, the apportionment of the order exceptions, the weighted count, or combinations thereof; and outputting the summary tables and the issue tables to a graphical user interface, wherein the summary tables include flowthrough counts and other metrics.

15. The non-transitory, computer readable storage medium of claim 14, wherein the instructions to create the issue tables are based on the updated exception data, and wherein the issue tables show activities that cause the order errors.

16. The non-transitory, computer readable storage medium of claim 14 further comprising:
    instructions to calculate a flowthrough impact percentage, wherein the flowthrough impact percentage is a calculation of a percentage of flowthrough errors that are cause by a specific error or issue.

17. The non-transitory, computer readable storage medium of claim 14 further comprising:
    instructions to load the order data about the plurality of orders; and
    instructions to load the exception data for the plurality of orders.

18. The non-transitory, computer readable storage medium of claim 14 wherein the plurality of exclusions includes automated exclusions and manual exclusions.

19. The non-transitory, computer readable storage medium of claim 14 wherein the summary tables are output to a graphical user interface.

20. The non-transitory, computer readable storage medium of claim 14 wherein the order data and the exception data are received incrementally.

\* \* \* \* \*